Dec. 17, 1968    S. A. McCLUSKY    3,416,620
BAG FILLING AND WEIGHING MACHINE
Filed March 1, 1967    6 Sheets-Sheet 4
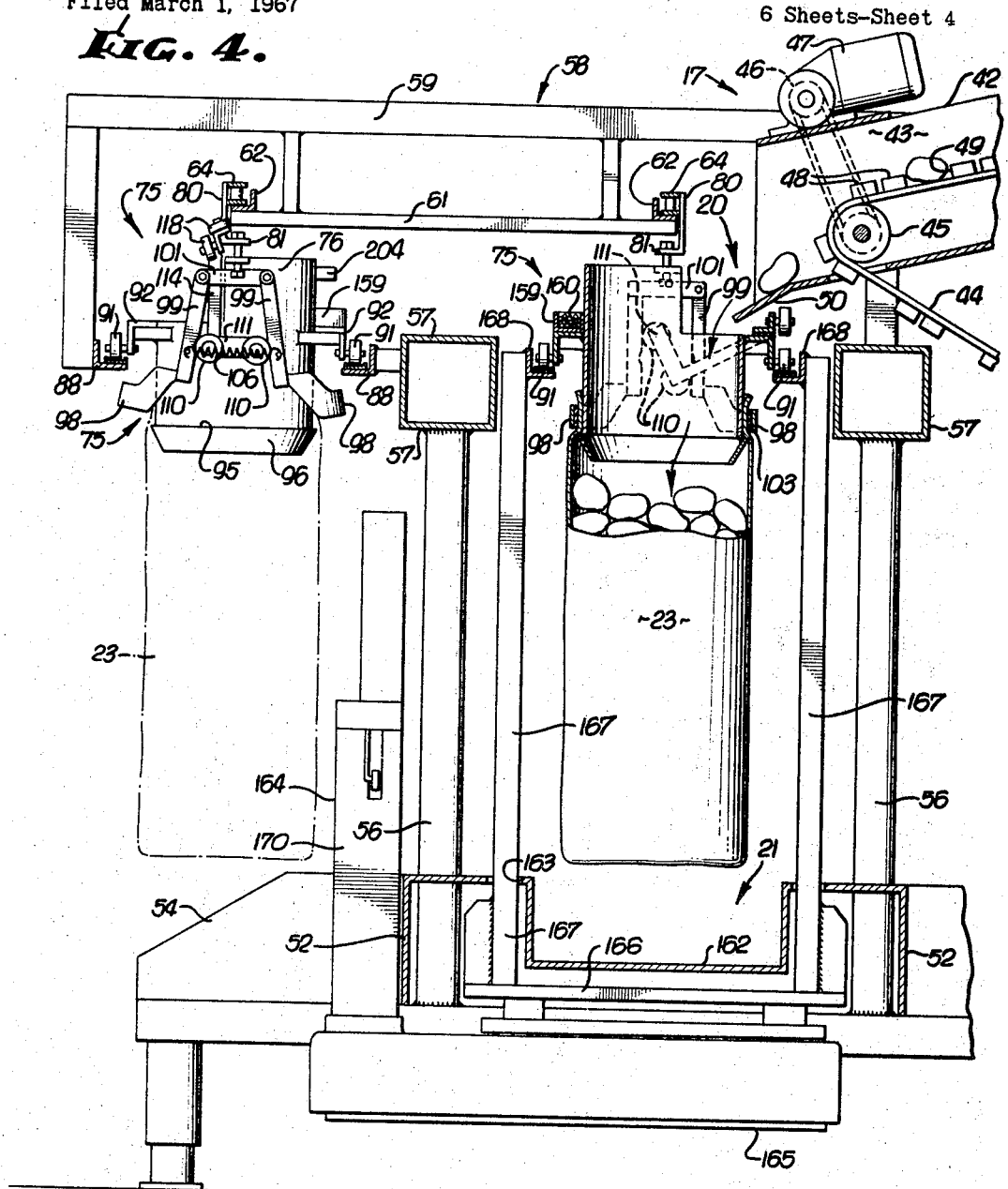
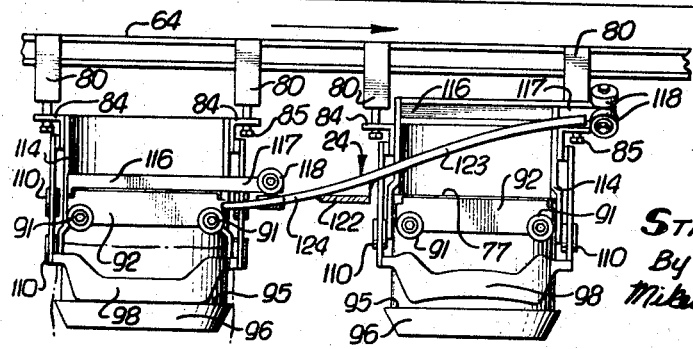
INVENTOR.
STANLEY A. McCLUSKY
BY Miketta, Glenny, Poms & Smith
ATTORNEYS.

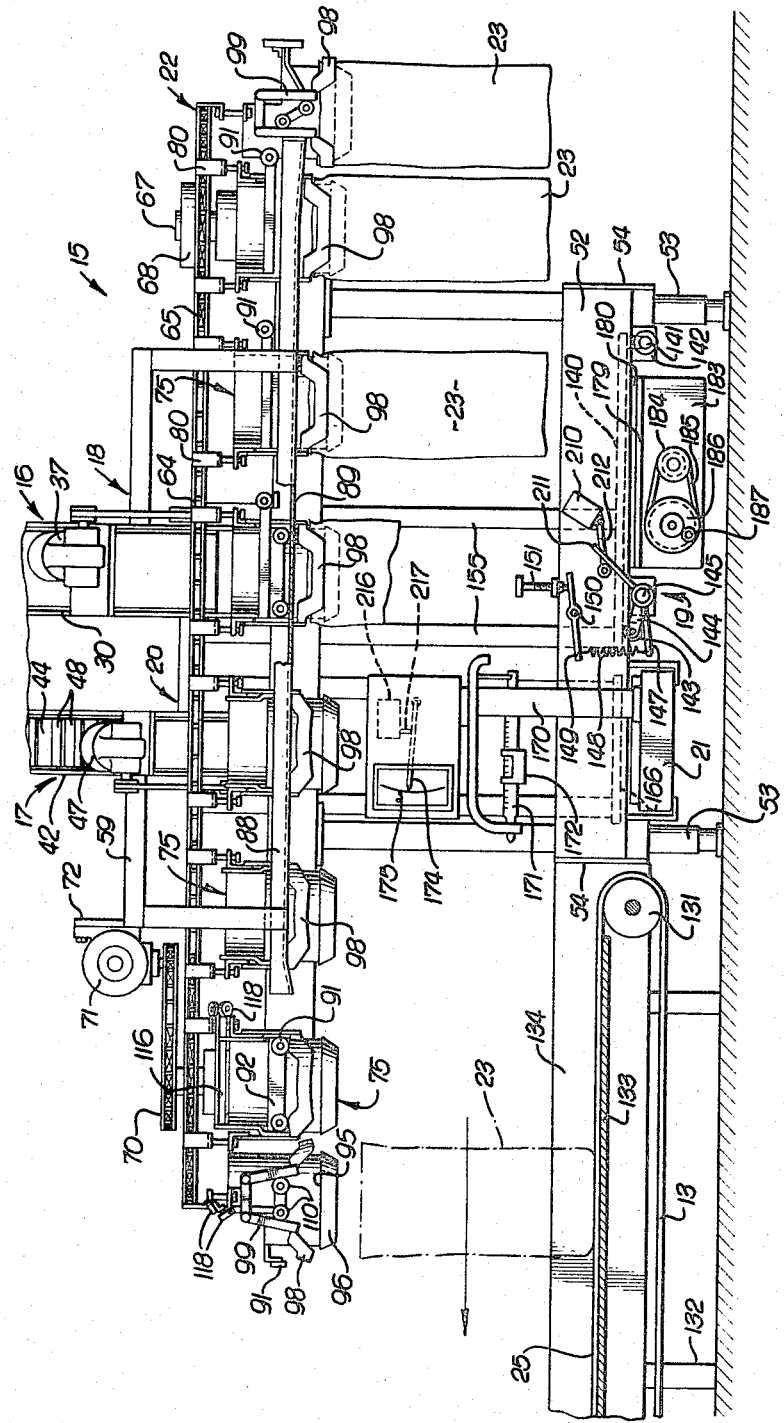

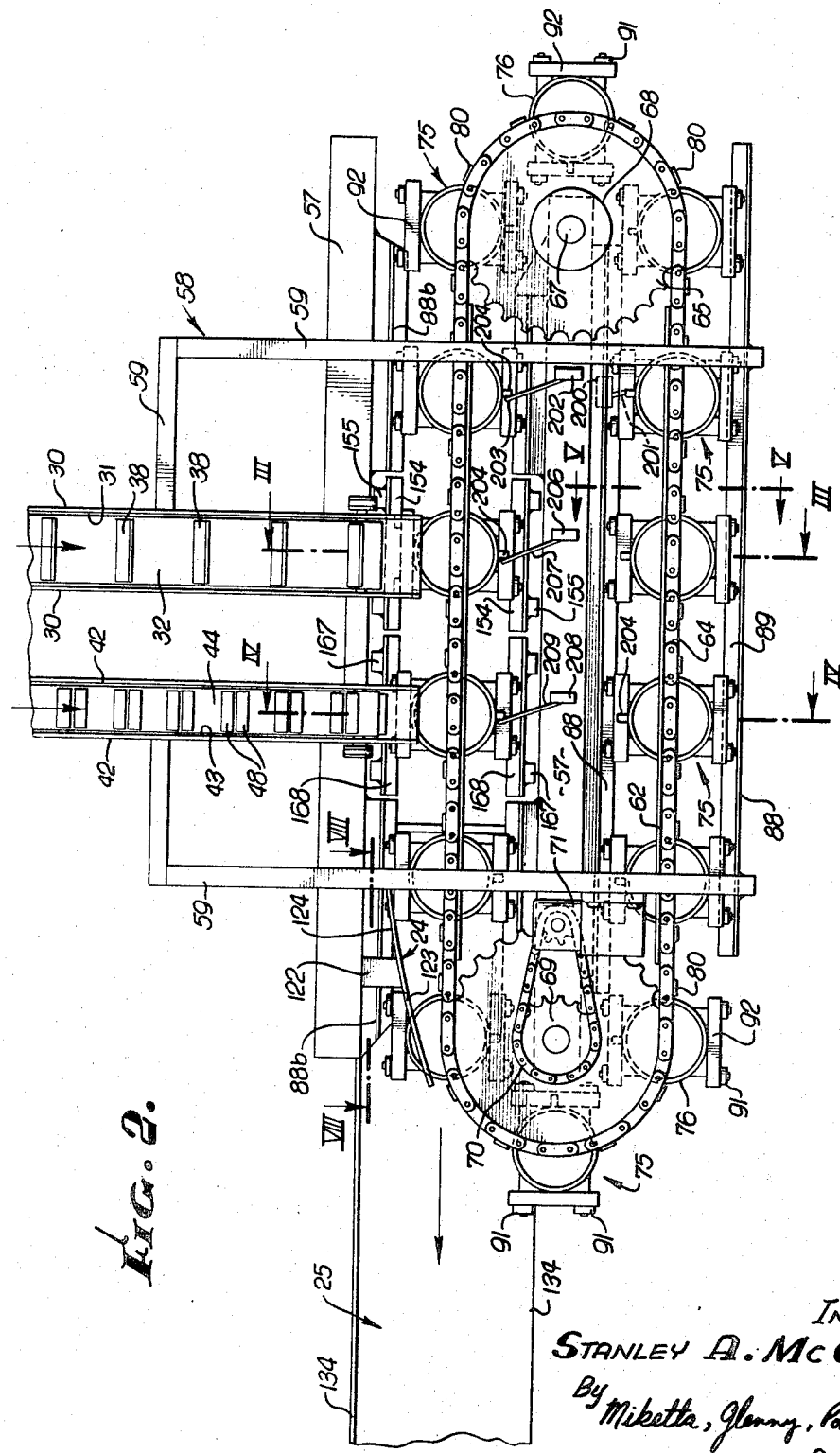

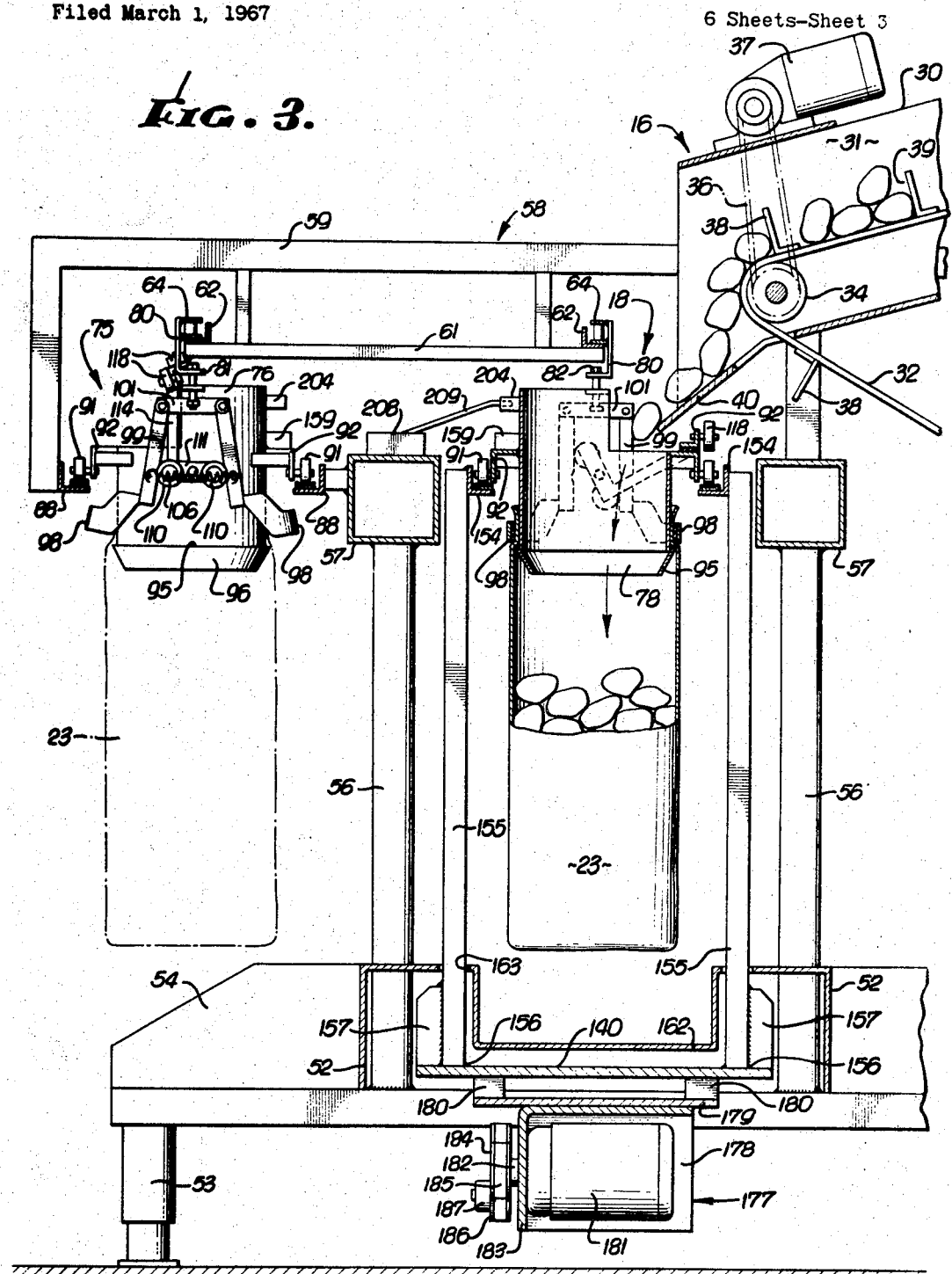

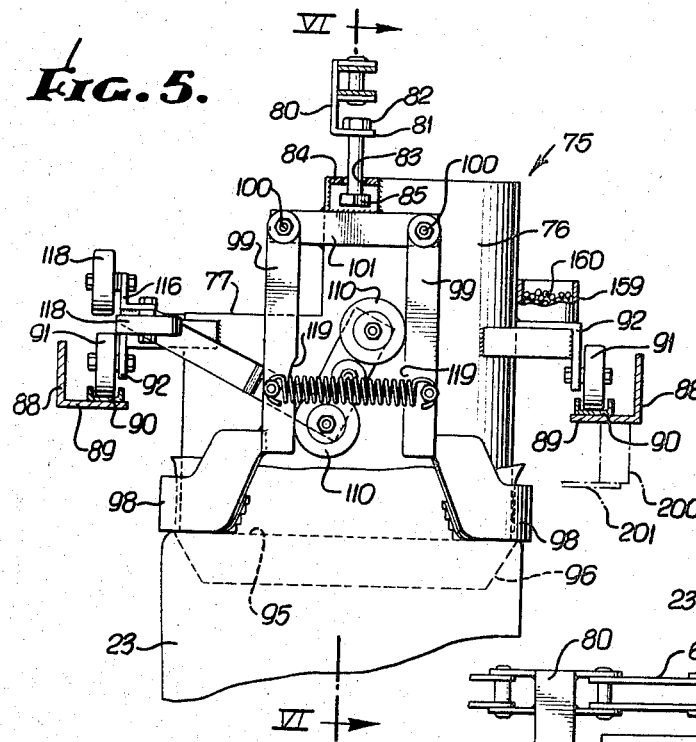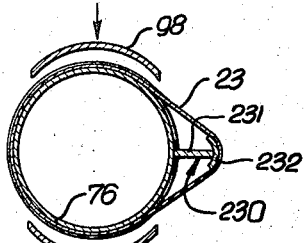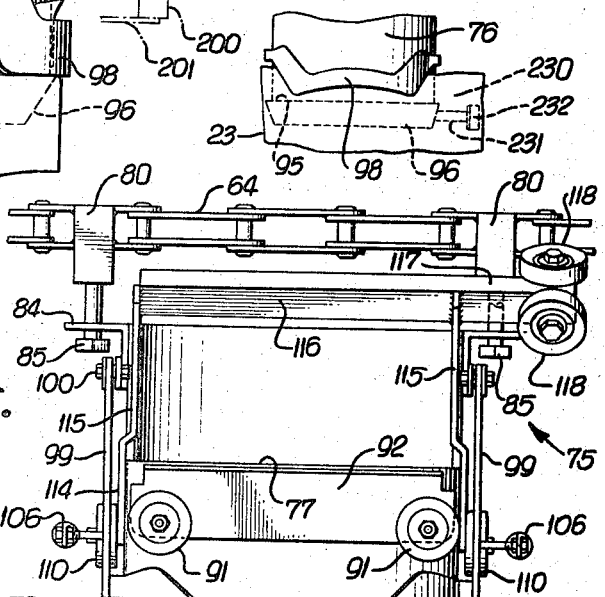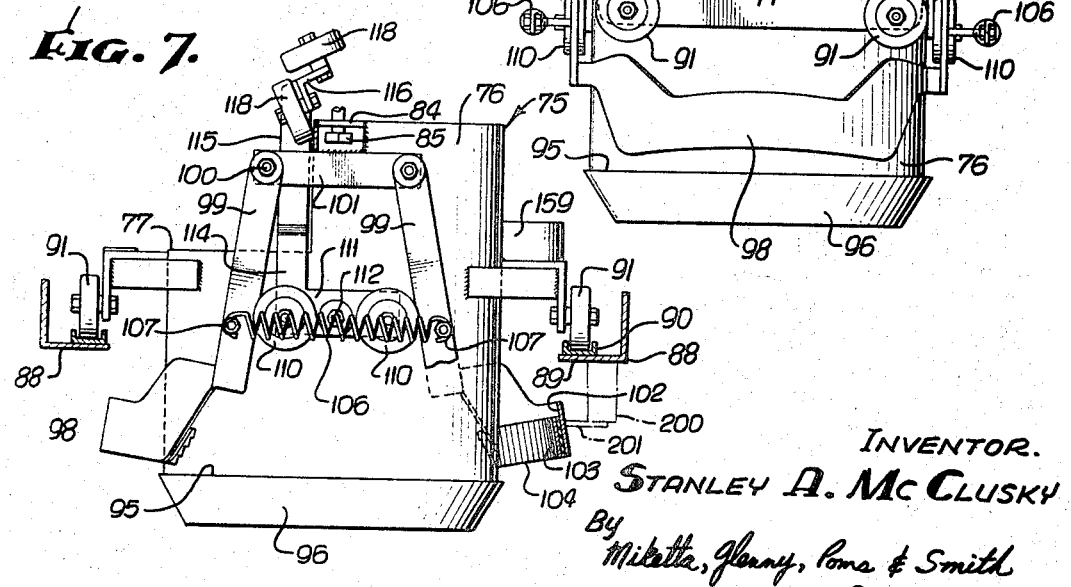

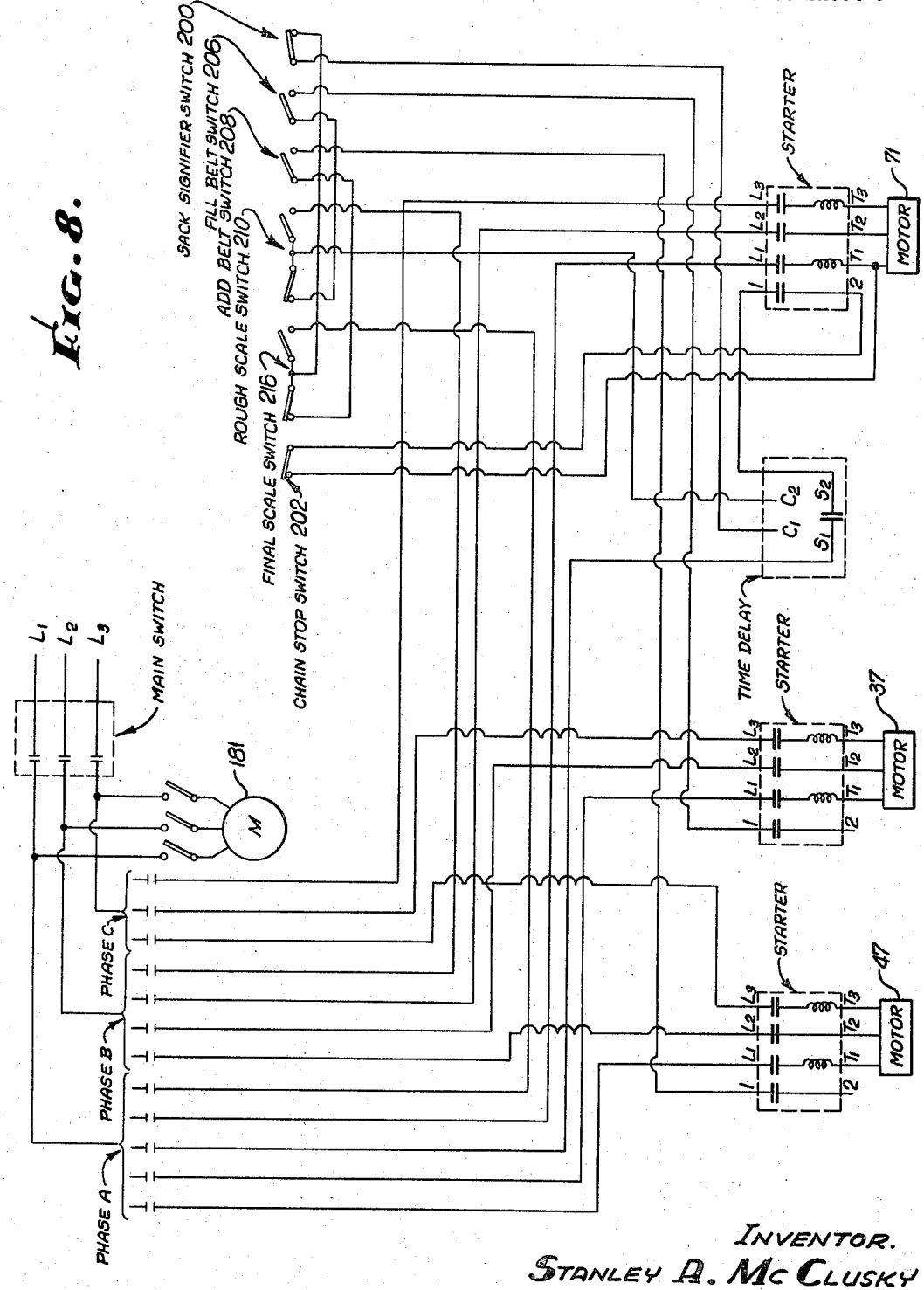

United States Patent Office 3,416,620
Patented Dec. 17, 1968

3,416,620
BAG FILLING AND WEIGHING MACHINE
Stanley A. McClusky, 3001 Baylor Ave.,
Bakersfield, Calif. 93305
Continuation-in-part of application Ser. No. 525,671,
Feb. 7, 1966. This application Mar. 1, 1967, Ser. No.
619,801
17 Claims. (Cl. 177—123)

ABSTRACT OF THE DISCLOSURE

A bag filling and weighing machine including an endless conveyor with bag holding devices carried thereby and releaseably suspending pliant bags in open condition. The conveyor stops at a main article feed station and a dribble article feed station for two-stage filling and weighing and at which stations the bags and bag holding devices are not supported by the endless conveyor and are weighed at weighing stations associated with each feed station. Each bag holding device frictionally grips and holds the open end of a bag in open position and is automatically released to deposit a filled and weighed bag onto a moving conveyor.

RELATED APPLICATION

This application is a continuation-in-part of application Ser. No. 525,671, filed Feb. 7, 1966 by applicant and entitled Means and Method for Rapidly Filling Receptacles.

BACKGROUND OF INVENTION

The invention generally relates to a two-stage filling of suspended pliant bags with discrete articles and to the weighing of such bags at such filling stations, the bags being filled while in suspended open condition. Produce such as potatoes, tomatoes, Brussels sprouts, pears, zucchini squash, cucumbers, plums and the like are generally sold by weight in cardboard cartons, burlap sacks, or bags of different size and material. My co-pending application Ser. No. 525,671 discloses the general concept of a two-stage filling and weighing machine adapted to fill containers or receptacles in open condition, the filling and weighing operation being performed at two adjacent stations with an empty box to be filled at a first station and a substantially filled but underweight box at a second station. Both receptacles are fed simultaneously, the empty receptacle from a main feed conveyor means and the underweight, pre-filled receptacle from a dribble feed conveyor means. The receptacle at the first feeding station receives its articles in bulk for rapid filling, and the receptacle at the second feeding station receives its articles individually and discretely to bring the pre-filled, underweight receptacle to a precise selected weight. When both receptacles have been filled to their separate different predetermined weights, which preferably occurs at approximately the same moment, the receptacle conveyor means on which they are carried is actuated to simultaneously advance the receptacles, the lead receptacle moving from the receptacle conveyor for storage or other distribution and the following receptacle being moved to the second filling station.

DESCRIPTION OF PRIOR ART

Prior proposed filling and weighing machines for receptacles have included a two-stage filling and weighing operation and have also included the use of a main feed conveyor at a first station and a dribble feed conveyor at a second station (see Patent 2,746,707 and co-pending application Ser. No. 525,671). Bag filling and weighing machines have also included bags which were held by hand at an article feeding spout to receive pre-weighed batches or slugs of articles or material which caused the bag to drop to a moving supporting conveyor surface which transported the filled bag out of the way of the next slug of material which was received by another bag manually positioned at the feed spout (see Patent 2,705,607). Prior proposed rapid weighing and packaging machines have included the movement along a conveyor of containers which are weighed when empty to determine tare weight which is automatically stored in a memory system so that the amount of material fed to the container at a final weight scale will be modified in quantity to produce a desired weight of material in the container.

Such prior proposed filling and weighing machines included several disadvantages and difficulties in operation. Among the disadvantages were the difficulty in maintaining a proper supply of material to the dribble feed conveyor, and difficulty of control of discharge of the dribble feed conveyor since such prior machines often used gates. Prior proposed memory systems to determine tare weight before a container was filled were complicated, expensive and not completely suited for field operation in packing houses. In addition, it was difficult to rapidly convey empty pliant flexible bags in open article receiving condition; to hold such open bags in suspended article receiving position, to hold such bags while receiving impact loads of articles falling and dropping thereinto, to settle and compact such articles in a suspended bag, and to weigh the bag without removal from the bag holding device.

SUMMARY OF INVENTION

The bag filling and weighing machine of the present invention contemplates a very compact arrangement of main and dribble article feed conveyor means arranged with respect to a bag conveyor means so that pliant flexible bags may be rapidly, readily handled, conveyed and virtually automatically filled and weighed in a foolproof manner and automatically discharged onto a conveyor which transports the filled bag to a selected destination.

The primary object of this invention is to disclose and provide a machine for weighing and filling pliant flexible bags with articles to a pre-determined weight in a rapid, effective, foolproof manner.

An object of the invention is to disclose and provide a novel bag filling and weighing machine which embodies the concept of my invention in application Ser. No. 525,671 and which particularly discloses and provides a novel concept construction and arrangement for handling pliant flexible bags or containers in combination with the two-stage filling and weighing machine previously disclosed.

Among the several objects and advantages of the present invention are included the provision of a bag holding device which readily and rapidly receives an open end of a pliant bag of paper, fabric or other suitable flexible pliant material, serving as a container or receptacle for the articles or other material being packaged; a bag holding device which rapidly and firmly clamps the open end of such a pliant bag to hold the bag in suspended position for communication with a feed inlet opening provided on the bag holding device; an endless conveyor system to move and carry the bag holding devices in a path past a main feed station where articles are fed into the suspended bag until a pre-selected underweight condition is reached, a second feed station wherein the underweight bag is brought to precise selected weight, and to an automatic release means for releasing the filled bag from the bag holding device and to position or deposit the filled bag on a conveyor for moving the filled bag away from the filling machine. Specific objects and advantages of the invention include the provision of a connecting means for the bag holding device and the endless conveyor means whereby the bag holding device and bag suspended therefrom are supported independently of the endless conveyor means at the weighing and feeding stations so that the filled bag may be weighed independently of the endless bag conveyor means; a means associated with the first filling and weighing station whereby the suspended bag may be subjected to vibrations to suitably settle articles being fed into the bag; and the provision of a frictional clamping means on the bag holding devices for positively supporting a bag in suspended position while receiving in the order of 50 lbs. or more of articles.

These and many other objects and advantages of this invention will be readily apparent from the following description of the drawings in which an exemplary embodiment of the invention is shown.

In the drawings:

FIG. 1 is a side elevational view of a machine embodying the present invention, the view being partly in section to show more clearly a conveyor for filled bags.

FIG. 2 is a top plan view of FIG. 1.

FIG. 3 is a vertical transverse sectional view taken in the plane indicated by line III—III of FIG. 2.

FIG. 4 is a vertical transverse sectional view taken in the plane indicated by line IV—IV of FIG. 2.

FIG. 5 is an enlarged elevational view of a bag holder device and bag as viewed from a vertical transverse plane indicated by line V—V of FIG. 2.

FIG. 6 is a side elevational view of the bag holding device shown in FIG. 5, the view being taken from the left of FIG. 5.

FIG. 7 is a view of the bag holding device shown in FIG. 5 with the bag clamps in open position.

FIG. 8 is a schematic circuit diagram showing the filling and weighing control means for the machine shown in FIG. 1.

FIGS. 9a and 9b are fragmentary top and elevational views respectively of a modification of the bag holding device.

FIG. 10 is a side elevational view of release means for the bag holding devices.

The bag filling machine 15 shown in the drawings generally comprises an independently actuated main article or bulk feed means 16, an independently actuable dribble or discrete feed means 17, a main or bulk feed station generally indicated at 18 with an associated first weighing means 19 and a dribble or discrete feed station 20 with an associated second weighing means 21. A bag conveying means 22 transports in intermittent manner bags 23 in open suspended condition past each feed station 18 and 20. Bag release means 24 causes filled and weighed bags to drop to a bag discharge conveyor means 25 which transports the filled and weighed bags away from the last feed station.

The main and dribble feed means 16 and 17 may be supplied with articles, in this example potatoes, in any suitable manner. The arrangement shown in co-pending application Ser. No. 525,671 is preferred and generally comprises a feed source of sized or unsized potatoes from which potatoes are discharged into collector or reservoir pockets which feed simultaneously both feed conveyors and which assures that a sufficient quantity of potatoes are available for the dribble conveyor. Flow of potatoes from the fed source into the main collector pocket is transverse to and first crosses the dribble feed pocket. In said co-pending application the main feed conveyor included a horizontally arranged feed belt upon which the bulk of the potatoes were deposited, while the dribble conveyor included an upwardly inclined conveyor portion which had its lower end in a dribble collector pocket which received potatoes from the transverse flow of potatoes thereacross to the main feed belt conveyor. While there are some structural changes in the main and dribble feed conveyors 16 and 17 disclosed in machine 15 as compared to the feed conveyors of the co-pending application their function and operation is substantially the same. Of course, it will be understood that with respect to the present invention the main and dribble feed conveyors may be fed by other types of feed sources.

The main feed conveyor 16 may comprise a suitable frame means, only partially disclosed, including an upwardly inclined pair of side walls 30 defining therebetween a channel 31 within which moves an upwardly inclined lay of an endless feed conveyor belt 32. Spaced from the discharge end of the main feed conveyor the belt 32 may be inclined slightly downwardly as shown in FIG. 3. Feed belt 32 may be supported at each change in direction by suitable rollers mounted on the frame means. As shown in FIG. 3 feed belt 32 passes around a drive roller 34 connected by drive belt 36 to a motor means 37 which is supported above side walls 30 and which is independently actuated or energized as later described.

Feed conveyor belt 32 in this example may include a plurality of relatively widely spaced upstanding angle section lugs or walls 38 which define a plurality of longitudinally spaced large pockets 39, each carrying a substantial quantity of potatoes therein. At the discharge end of the main feed conveyor the potatoes in each pocket 39 pass downwardly over a delivery apron 40 which directs the potatoes into an open empty bag 23 stopped at the first feed station 18.

The dribble feed conveyor means 17 includes similar conveyor structure comprising a frame means including spaced parallel side walls 42 defining therebetween a channel 43 within which moves an endless dribble feed belt 44. Feed belt 44 may be supported by suitable spaced rollers and at the discharge end of the dribble feed means may be driven by a roller 45 connected to a drive pulley 46 driven by motor means 47 which is independently actuated and energized as later described.

Dribble feed belt 44 may include a plurality of spaced pairs of transverse blocks 48 which may be longitudinally adjustable to vary the width of a pocket 49 adapted to carry a single potato of selected size or one or more potatoes of selected aggregate approximate size or weight. The construction of the dribble feed belt 44 and sets of blocks 48 is similar to the dribble feed conveyor described in said co-pending application. At the discharge end of the dribble feed means each discrete potato falls upon a delivery apron 50 which directs the potato into a substantially filled but still underweight bag 23 at the second feed station 20.

Feed stations 18 and 20 are so constructed that the delivery aprons 40 and 50 of the feed conveyor means 16 and 17 are in transverse alignment and lie parallel to the longitudinal path of one lay of the bag conveying means 22. The direction of approach of feed conveyor means 16 and 17 to the feed stations 18 and 20 may vary from the perpendicular approach shown in order to meet space and other installation requirements.

Bag conveying means 22 may comprise a frame structure including a bottom front frame member 52 supported by front feet 53, side members 54 which extend rearwardly alongside a portion of feed conveyor means 16 and 17, and a bottom back transverse member (not shown) supported by feet similar to feet 53. Upstanding frame members 56 may be interconnected by box section front and back transverse members 57 and from which is carried an upper frame superstructure 58 comprising a pair of transversely spaced top side members 59. Between their ends, top side member 59 support in depending arrangement transverse crossbars 61 which carry at their outer ends a pair of angle section chain guide members 62.

The bag conveying means 22 includes an endless link or roller chain 64 having parallel lays supported and guided by members 62. Endless chain 64 extends beyond opposite ends of guide members 62 for meshed engagement with end sprockets 65 disposed in the same plane as guide members 62 and having a plurality of teeth adapted to interlockingly engage roller chain 64. Each sprocket 65 may be rotatably mounted about an axis 67 by a suitable mounting means 68 supported from the front transverse box-section member 57. At one end the pivotal mounting means 68 may include a drive sprocket 69 engaged by a drive chain 70 driven by a motor means 71 mounted on a suitable bracket 72 fixed to the top frame member 59. The endless chain drive motor 71 may be actuated and energized as later described to provide suitable intermittent motion for stopping each bag 23 at each of the feed stations.

Bag holding devices 75 are connected to endless chain 64 for movement thereby and are also supported over certain portions of their path of travel by suitable parallel guide rails 88 provided on the frame means. Each bag holding device 75 may comprise a generally cylindrical hollow metal body member 76 having a vertically disposed axis. A section of slightly less than 180° may be cut out of the top portion of member 76 to provide a top feed inlet 77 facing exteriorly of the endless bag conveyor means for positioning at and partially beneath the delivery aprons 40 and 50 of the feed conveyor means. The bottom portion of the cylindrical body member provides an outlet 78 which extends within the top open end of a bag 23 held on the body member 76.

Means for connecting cylindrical body member 76 to the endless bag conveyor chain 64 may comprise a pair of opposite angle hanger brackets 80 (FIG. 5) secured to and depending from links of the chain means 64. The bottom horizontal inboardly extending leg 81 of bracket 80 carries a support or hanger bolt 82 which extends through an enlarged port 83 provided in an outwardly extending bracket ear 84 welded to the adjacent exterior surface of the top of the cylindrical body member 76. Port 83 in each ear 84 is provided a very loose association with bolt 82. Each bolt 82 is provided with a head 85 adapted to be spaced from the bottom face of ear 84 at certain locations of the bag holding device in its path and at certain other locations to be in supporting engagement with ear 84.

Means for supporting the bag holding device 75 when bolts 82 are not required to support or suspend such devices may comprise a pair of parallel guide support tracks or rails 88 supported from the frame superstructure 58 and from the front transverse box-section member 57 along the path of the front lay of chain 64 and in parallel spaced relation thereto. Each rail 88 may comprise an angle section member having a horizontal leg 89 upon which may be secured a shallow U-section track member 90 for engagement with pairs of transversely opposite wheels 91 rotatably mounted on suitable bracket extensions 92 so as to comprise wheeled carriage means secured to the cylindrical body member 76. In FIG. 2 it will be apparent that rails 88 will support bag holding devices 75 in their path along the front lay of the endless bag conveyor means. Along the back lay of such bag conveyor means similar support is provided for the bag holding devices before and after feed station means 18 and 20. Such back rails are identified by reference numerals 88b and are supported from the frame means in a manner similar to that described with respect to the front rails 88.

It will thus be apparent that the bag holding devices 75 are supported from rails 88 during their movement along the front lay, are not supported by such rails as the device travel around sprockets 65 at each end of the bag conveying means but instead are supported by the spaced hanger bolts 82 during passage of endless chain 64 around the sprockets, and then rollingly re-engage the tracks 88b as the bag holding devices approach and leave feed stations 18 and 20. While the bag holding devices are transported and stopped, the manner of supporting the bag holding devices at the feed stations 18 and 20 will be described as part of the weighing stations.

Each bag holding device 75 includes bag clamping means for securely holding and supporting the top open end of a bag 23 during filling and weighing and transporting of a bag 23 by the bag conveyor means 22. The bag clamping means comprises an upwardly facing annular shoulder or ledge 95 provided adjacent and above the bottom inwardly flared portion 96 of the cylindrical body member 76. The inwardly flared portion 96 facilitates upward ensleevement of an open pliant flexible bag into a position above ledge 95.

Above ledge 95 a pair of diametrically opposite arcuate clamping members 98 are carried by fixedly secured and upwardly extending arms 99 having their top ends pivotally mounted at 100 to a transverse bar 101 secured to the cylindrical body member as by welding and below ears 84. Each clamping member 98 includes an inner arcuate surface 102 subtending an angle of greater than 90° and which may be lined with a suitable resilient vertically serrated rubber lining 103. The bottom edge 104 of each lining 103 closely fits over ledge 95 and the interior surface of lining 103 has pressure engagement with the surface of cylindrical body member 76 when the clamping members are in closed clamped position. Thus when the top open end of a pliant flexible bag is ensleeved over the lower bottom portion of member 76 and the clamping members moved to closed position the material of the bag is tightly and firmly pressed against the body member and the close fit between the bottom edge 104 and the ledge serves to tightly frictionally engage the bag material.

Means for actuating the clamping members 98 into and out of bag engaging position may comprise a coil tension spring 106 on opposite sides of body member 76 and secured at its ends as at 107 to bottom portions of arms 99. Springs 106 bias arms 99 and clamping members 98 toward each other and into closed clamping position.

Means for moving the clamp members into open bag receiving position may comprise, at opposite sides of member 76, a pair of spaced rollers 110 pivotally mounted at opposite ends of a bar 111 pivotally mounted at 112 on body member 76. One end of bar 111 may be rigidly fixed to the inner end 114 of an offset arm 115 which may extend, in clamp member release position, to just beyond the top of body member 76. Arms 115 of each bag holding device may be interconnected by an angle section transverse handle member 116 which may include an extension 117 for pivotally mounting on each wall of the extended portion rollers 118 arranged with their axes at 90° for cooperation with bag release means 24. As best seen in FIG. 7, in clamp open position, member 116 lies above and transverse to the inlet 77. In such position the bar 111 is horizontally transversely disposed and has spread arms 99 apart so that the clamp members 98 are in bag open receiving position. Inner edges of arms 99 may be provided with shallow curved dwell recesses 119 to receive, hold, and position rollers 118 for maintaining clamp members 98 at open maximum position.

Assembly of a bag 23 with a bag holding device 75 includes manual ensleevement of an open ended bag 23 over the bottom portion of body member 76 while the clamp members are in open position as shown in FIGS. 6 and 7 and in FIG. 1 opposite the feed and weighing stations 20, 21. While the bag conveyor means is stopped for a filling operation to be performed at filling stations 18 and 20, an operator may readily slip the open end of bag 23 on the body member 76. As the bag is held in place with one hand, the other hand of the operator may grasp handle member 116 to pull the same downwardly so as to release rollers 110 from dwell recesses 119 and permit the coil springs 106 to rapidly and tightly close the clamp members 96 over top edge portions of bag 23. A bag so held is shown in FIG. 5 and in FIG. 1 opposite the first filling and weighing stations 18 and 19. The bags 23 are held by clamping members 98 until the bags are precisely filled at the second filling and weighing stations 20 and 21 and pass therebeyond to the bag release means 24.

Bag release means 24 is best seen in FIG. 2 and in FIG. 10. Box section frame member 57 may carry a bracket 122 which extends inboardly to support a selectively upwardly and inwardly curved rod 123. The lower end 124 of rod 123 is positioned in the path of the extension 117 and angularly related wheels 118. As bag holding device 75 advances to the end of rod 124 the wheels 118 will then engage the top and the inner sides of rod 123. As holding devices 75 are intermittently advanced by bag conveyor chain 64 the wheels 118 will be guided upwardly and inwardly by rod 123 to cause handle 116 to move upwardly and the clamp members 98 away from their closed position. Bag 23 is released as soon as the pressure gripping contact of the clamp members with the bag is relieved.

Immediately beneath bag release means 23 and extending from approximately the second feed station 22 is the filled bag discharge conveyor means 25 which is best seen in FIG. 1. The conveyor means 25 may comprise an endless belt 130 of selected length and supported by end rollers 131 carried on a suitable frame extension 132. The top lay of belt 130 may be supported by a horizontal plate 133. Suitable side walls 134 may be provided to guide the filled and weighed bags 23. At the remote end of the conveyor 25 the filled bags may be loaded onto suitable means for transport or for storage.

The first station weighing means 19 is best seen in FIGS. 1 and 3. Weighing platform 140 may be pivotally mounted about an axis remote from weighing station 19 by a suitable transverse shaft 141 rotatably carried in depending mounting means 142 secured to frame structure 52. The opposite end of platform 140, which lies beneath feeding station 18, may be supported by a roller 143 carried on the end of an arm 144 fixedly secured to a shaft 145 rotatably mounted at its ends from the frame structure as at 146. Shaft 145 may carry an arm 147 to which the lower end of a biasing spring 148 is connected, the upper end of said spring being connected to an adjustable tensioning arm 149 pivotally mounted at 150 intermediate its ends to the frame structure and positioned by an adjustment bolt 151 threadedly carried on the frame structure and having a lower end in engagement at 152 with said arm for adjustably depressing or raising that end of the arm to tension spring 148. Thus, weighing platform 140 may be adjusted to be displaced downwardly about the pivotal shaft 141 a selected distance at a selected weight. A similar weighing platform and its adjustment is described in my said co-pending application.

A bag 23 positioned at filling station 18 is not placed upon the top surface of weighing platform 140 but instead is held in suspended spaced relation thereabove. At such position bag holding device 75 is not carried by the rails 88b on the frame. Instead, wheels 91 are supported upon track sections 154 which are secured adjacent their ends to top ends of upstanding posts or side columns 155 secured at their lower ends as by welding at 156 to platform 140. Gussets 157 welded to the bottom portions of columns 155 and platform 140 reinforce the upstanding columns. In normal unloaded position, platform 140 so positions the track segments 154 that they are at substantially the same level as adjacent rails 88b.

In such weighing position at station 19 as bag 23 is rapidly bulk filled with potatoes and the weighing platform 140 and the track segments 154 are displaced downwardly such displacement will be permitted relative to and free of bag conveyor chain 64 and its supporting members by the loose connection of suspension bolts 82 in ports 83 and the vertical space between bolt heads 85 and bracket ears 84. Thus weight imposed at the first weighing station 18 will comprise the weight of bag holding device 75 as well as the underweight amount of potatoes received in the bag. Tare weight of device 75 is measured and equalized between the several bag holding devices 75 by means of a suitable container 159 carried on bracket 92 and containing small weights or shot 160. When tare weight is equalized for all holding devices 75 and the weighing means calibrated for such weight the platform 140 may be adjusted by adjustment bolt 151 to receive only a preselected underweight of potatoes in bag 23.

The weighing station 21 (FIG. 4) beneath the dribble feed station 20 may comprise a well-known beam type scale 164 carried by suitable brackets 165 on the frame structure and having a weighing platform 166 supported beneath a bag 23 at the dribble feed station. Platform 166 has welded thereto upstanding columns 167 which support and carry at their top ends track segments 168 for receiving wheels 91 of a bag holding device 75 which has been moved from the first weighing station 19 to the second weighing station 21. The vertical height of track segments 168 is preselected for an unloaded condition to smoothly receive wheels of a bag holding device 75 from first weighing station 19 in underweight condition. Scale 164 may include an upstanding post or column 170 from which extends a balance beam 171 with a slidable weight 172 thereon which is positioned to a desired precise weight of a bag of potatoes. An indicator arm 174 may be pivotally mounted at one end from the post 170 above the balance beam and its other end moves relative to plus and minus scale indicia 175 in well-known manner. Thus when an underweight bag 23 is advanced from the first weighing station 19 to the second station 21 the scale 164 receives the underweight bag and bag holding device on the track segments 168 and individual discrete potatoes are dropped in to the bag from the dribble conveyor 17 to incrementally increase the aggregate weight of the bag of potatoes until the desired preset scale weight is satisfied. The precisely filled bag 23 at weighing station 21 will be moved therefrom at the same time that the underweight filled bag 23 at weighing station 19 reaches its underweight condition.

In very rapid operation of the main feed conveyor 16 and the dribble conveyor 17 spillage of potatoes may sometimes occur at the filling stations 18 and possibly 20. To prevent such spillage of potatoes from influencing the weight being measured at both filling stations, a suitable trough shaped cover 162 may be secured to the frame members above the weighing platform 140 and scale plate 166. Enlarged openings 163 may be provided in the cover 162 for each column 155 and 167 which form part of the weighing apparatus at said stations so that the columns may freely vertically move within such openings during a weighing operation.

It is desirable, of course, that bags 23 be not only properly weighed to a precise weight but also that the bags be substantially full. To provide full bags with the potatoes therein in relatively firm packed condition, weighing station 19 is provided with vibrating means generally indicated at 177 (FIGS. 1 and 3). Vibrating means 177 may comprise a bracket mounting member 178 secured as by welding to a horizontal plate 179 attached by spaced upstanding blocks 180 to the bottom surface of weighing platform 140. Bracket 178 carries a motor means 181 having a motor shaft 182 extending through a vertical wall 183 of the bracket member 178. Outboardly of wall 183 motor shaft 182 carries a drive pulley 184 which is connected by a pulley belt 185 to an enlarged pulley wheel 186 pivotally mounted on wall 183 beneath the central portion of weighing platform 140. Pulley wheel 186 may carry a suitable eccentric weight 187 adjacent its circumference in order to impart force vibrations to weighing platform 140 and to the bag 23 supported thereabove from weighing station posts 155. Thus when motor 181 is energized the weighing station 19 is subjected to suitable vibratory forces to cause the potatoes being fed to bag 23 to settle and generally firmly pack in bag 23.

Operation of bag filling machine 15 will be described in connetcion with a system of electrical switch means which serves to control the actuation of the several conveyor means 16, 17 and 22 as well as the weighing of bags 23 at the stations 19 and 21. The electrical switching system is generally similar to that described in my co-pending application.

It will be understood that a suitable supply source of potatoes is used to feed the main and dribble feed conveyors 16 and 17. Empty bags 23 are manually installed on the bag holding devices 75 at a point on the bag conveyor means 22 generally opposite the main feed conveyor 16. As previously described when the bag is ensleeved over the bottom portion of bag holding device 75 the clamp members may be pressure engaged therewith by pulling downwardly on the handle 116. In such position, the outer surface of the inboard clamp member 98 is relatively close to the cylindrical surface of body member 76. To signify that a bag has been assembled with a device 75 and is held by closed clamp members 98, a switch means 200 may be carried on frame member 88 at approximately the same height as inboard clamp member 98. Switch means 200 includes a switch arm 201 which extends toward the inboard clamp member 98. Switch means 200 is normally closed. In the event clamp member 98 is not in closed clamp position, it will contact switch arm 201 to open the normally closed switch means 200 to de-energize bag conveyor motor means 71 through time delay means 214 as later described so that bag holding devices 75 will not be advanced until each bag passing switch means 200 is in clamped assembly with bag holding devices 75.

As a bag holding device 75 is intermittently advanced by bag conveyor means 22 around the end of sprocket 65 it will approach on rails 88 the main filling station 18. In order to accurately and positively stop a bag holding device 75 and bag 23 at each filling station a switch means 202 may be carried on frame member 57 and is provided with a switch arm 203 which extends outboardly for contact with an inboardly extending strike lug 204 provided on each bag holding device. Switch means 202 is normally closed and when arm 203 is contacted by strike lug 204 the switch means 202 will be opened to stop the bag holding device at that position and with the preceding bag holding device 75 in accurate alignment with the feed stations 18 and 20. Opening of switch means 202 opens the circuit to the motor means 71 which is de-energized until it is actuated by the switch means associated with the weighing stations as later described.

At the main feed station 18 a switch means 206 may be carried by frame member 57 and has a switch arm 207 which is contacted by a strike lug 204 on a bag holding device 75. Switch means 206 is normally open and when it is contacted by a switch lug 204 switch means 206 is closed and energizes the main conveyor motor means 37 for actuating and starting the main flow of potatoes along the main feed conveyor means 16.

Opposite filling station 20 a switch means 208 has a switch arm 209 for contact with a strike lug 204 on a bag holding device 75. Switch means 208 is normally open and when its switch arm 209 is moved to switch closed position by a strike lug 204 the dribble feed conveyor means 19 is actuated by energization of the motor means 47 by the closed switch means 208.

At the main weighing station 19 a switch means 210 is actuated by lowering of platform 140 whose motion is transmitted through turnable shaft 145 to switch actuating arm 211 which engages the switch arm 212 of the switch means 210. Switch means 210 includes two sets of contacts, one set being normally closed and the other set being normally open. At a pre-selected weight represented by downward displacement of the weighing platform 140, the closed set of contacts of switch means 210, which are connected to the main feed switch means 206, will be opened to stop the main feed conveyor means 16 and to thereby stop the bulk feed of potatoes to bag 23. At the same time such movement closes the open set of contacts in switch means 210 to complete a circuit to time delay means 214 to condition the time delay for the next move of the bag conveyor means 22 which will occur upon the weight condition of the second feed station being satisfied.

Switch means 216 may be carried by scale 164 adjacent to weight indicator arm 174 and has a switch arm 217 contacted by the indicator arm 174 when a precise pre-selected weight of potatoes is obtained at second weighing station 21. Switch means 216 includes two sets of contacts, one set being normally closed and one set being normally open. When precise weight is obtained at the second weighing station 21 the normally closed set of contacts of switch means 216, which is connected with dribble feed switch means 208, is opened and dribble feed conveyor 17 is stopped. The normally open set of contacts in switch means 216 is closed at such precise weight to complete a circuit thru the bag signifier switch means 200 (normally closed) to the time delay 214 for the bag conveyor means 22. Since dribble conveyor means 17 normally discharges only single potatoes to bag 23 at the second weighing station 21 and since the potatoes are relatively widely spaced apart on conveyor 17 only one potato or its equivalent at a time falls into a bag 23. If the selected weight is satisfied by that one potato the dribble conveyor means 17 will be stopped before the succeeding potato will be discharged from its pocket on conveyor 17 onto the delivery apron 50.

When both bags 23 at stations 19 and 21 have been independently and separately filled and weighed to their pre-determined weight condition the normally closed sets of contacts of switch means 210 and 216 have been actuated to open position and the conveyors 16 and 17 have been stopped. The normally open sets of contacts of said switch means 210 and 216 have been closed either simultaneously or independently to complete the circuit to the time delay means 214. If sack signifier switch means 200 is open because clamp members are not grasping a bag 23, then the bag conveyor will remain stopped until a bag is placed on device 75. Such condition at weighing stations 19 and 21 and at the sack signifier switch 200 permits actuation of the bag conveyor means 22 through a time delay relay in time delay means 214 which energizes a coil in a magnetic starter for the bag conveyor motor means 71. The bag conveyor means will then be actuated and bag holding devices 75 will be advanced to their next position. Switch means 202 when contacted by the next strike lug 204 of the succeeding bag holding device 75 will open the circuit to the bag conveyor motor means 71 and the coil in the starter is again de-energized until actuated by the weighing station switch means 210 and 216.

When a bag holding device 75 with a precisely filled and weighed bag 23 is advanced from the second filling and weighing stations it will be engaged by bag release means 24. As the rollers 118 contact the rod 123 the clamp actuating arm 116 will be raised, the clamp members 98 released from their closed position, and the bag 23 released from the bag holding device 75 so that the filled bag will drop upon the discharge conveyor means 25.

As the bag conveyor means 22 intermittently advances bag holding devices to the first filling and weighing station and thence to the second filling and weighing station the cycle of operation of the bag conveyor 22, main feed conveyor means 16 and dribble feed conveyor means 17 will be repeated. The time delay means 214 assures that potatoes being fed from the main feed conveyor 16 will not continue to be fed as the bags begin movement between stations. Satisfaction of the weight condition at either station 19 or 21 will not alone produce actuation of the bag conveyor means 22 and the pre-selected weight condition must be satisfied at both weighing stations before further advancement of the bag conveyor means occurs. Since the bag at the second station 21 may be filled to its precise weight prior to the filling of the pre-selected underweight condition of the bag at the first station, and the flow of potatoes from main feed conveyor 16 may be the last to be stopped, such time delay means assures that potatoes passing over the discharge apron at the end of the main conveyor means 15 will fall into a bag 23.

Vibrator motor means 181 may be connected to the electrical system in any suitable manner. Motor means 181 may be continuously operated while the machine is running.

It will be readily understood that the bag filling and weighing machine 15 described above achieves speed of operation by very rapid filling and weighing of a bag 23 at a first stage to an underweight yet almost final weight condition and that during the elapsed filling time for the first stage, the bag at the second filling station is filled to final precise weight by the automatic addition of a necessary number of discrete potatoes from the dribble conveyor 17. Relative speeds of filling bags 23 at the two stages or stations may be adjusted so that completion of filling of both bags occurs at about the same time. Thus, a circuit condition is satisfied so that bags 23 at both stations may be simultaneously advanced. Such method of operation permits little wasted time in the bag filling and weighing operation.

It will be understood, of course, that the bag filling machine 15 described above may be employed in the bagging of produce and articles other than potatoes. In the described example a bag 23 has been shown which would be normally capable of containing approximately 50 lbs. of potatoes. Bags of greater length or of shorter length may be used with a machine embodying this invention. For example, if 100 lb. sacks were used, bag holding device 75 may be modified by providing an attachment or projection 230 (FIG. 9) of generally T-shape with the stem 231 of the T positioned in the direction of travel of the bag holding device. The head 232 of the T may be curved so that the additional fabric material of a 100 lb. bag at its opening could be supported forwardly or rearwardly of the bag holding device without interference with clamp members 98.

Smaller bags of less depth can also be readily accommodated by the bag holding device 75 as long as the diameter of the opening of the bag is large enough to ensleeve the bag over the lower portion of the body 76.

It is important to note, that the bag conveyor means and the bag holding devices provide a novel way to advance a pliant bag in open suspended condition to a filling station. In such advancement the bag holding devices are carried by tracks 88 and there is relatively little weight imposed upon the bag conveyor chain. As the device 75 turns around an end sprocket, since the bag 23 is empty the only weight imposed upon the conveyor chain is the tare weight of a bag holding device and bag. As the bag holding device 75 approches the filling station its tare weight is transferred to a novel weighing structure in which the weighing means includes track segments aligned with the conveyor track means. At each weighing station the bag conveyor chain becomes virtually independent of the bag holding device. By careful equalization of tare weight of each of the bag holding devices 75 with empty bags 23 associated therewith, together with proper adjustment of the weighing means, accurate, precise, weighing and filling of the bags with potatoes is provided.

It should also be noted that the clamp members 98 are provided with relatively long arcuate length so that pressure engagement of the material of the top of the bags 23 against the bag holding body 76 will firmly and tightly hold the bags while they are subjected to the falling weight of the potatoes, particularly at the main bulk feeding station 18. Thus, a novel manner of supporting, holding and releasing a pliant open ended bag from a bag holding device has been described in the present embodiment of this invention.

It will be understood that the bag filling and weighing machine described above may be changed and modified to handle different types of articles in different quantities and in somewhat different manner. Bag holding device 75 may be modified so as to provide weighing of a preselected quantity of products or articles in body 76 and then depositing such articles upon a suitably positioned conveyor in accurately pre-weighed groups.

I claim:
1. In a bag feeding machine including an independently actuatable main article feed means with an associated first weighing station means, an independently actuatable dribble article feed means with an associated second weighing station means, and means for simultaneous movement and release of bags from said weighing stations only after each bag is filled to a predetermined weight, the improvement comprising:
   a bag conveying means for transporting bags to and from said weighing stations,
   said conveying means including an endless conveyor chain having one lay passing above said first and second weighing station means,
   a plurality of spaced bag holder means loosely connected with said conveyor chain,
   track means for supporting said bag holder means at locations other than said weighing station means,
   track segments carried by each of said weighing station means in alignment with said track means to support said bag holder means at said weighing station means free of said conveyor chain for transmitting loads to said weighing station means;
   means on said bag holder means for suspending and holding a bag in open condition;
   and means for releasing said bag from said bag holding means after passing said second weighing station means.

2. In a bag feeding machine as stated in claim 1 including spaced means laterally and vertically loosely connecting and suspending said bag holder means from said conveyor chain.

3. A bag feeding machine as stated in claim 1, wherein said means for suspending and holding a bag in open condition includes a cylindrical portion on said bag holder means and clamping shoes pivotally mounted on said bag holder means and cooperable with said cylindrical portion for frictionally retaining the upper open end of a bag.

4. A machine as stated in claim 3, wherein said means for releasing said bag from said bag holding means includes:
   a clamp actuating member carried on said bag holding means;
   cam means adjacent the path of said bag holder means;
   and cam follower means on said clamp actuating member.

5. A bag holder means for holding open a mouth of a pliant bag and for suspending the bag at said mouth during filling and weighing comprising:
   a cylindrical body member having a through passageway,
   bag clamping shoes on opposite sides of said cylindrical body member for frictionally retaining under pressure top portions of a bag sleeved over a bottom portion of the cylindrical body member;
   means pivotally mounting said clamping shoes on said cylindrical body member;
   means cooperable with said mounting means for actuating the clamping shoes into clamped and open released position;
   and means for selectively supporting said bag holder means including wheeled carriage support means carried by said body member adapted to operatively engage track support means and suspension support means on said body member adapted to be connected to conveying means.

6. A bag holder means as stated in claim 5 including means below said clamping shoes and cooperable therewith for retaining the top portion of a bag on said cylindrical body member.

7. A bag holder means as stated in claim 6, wherein said means below said clamping shoes includes an annular shoulder on said cylindrical body member.

8. A bag holder means as stated in claim 5, wherein said means to actuate said clamping shoes includes cam follower means;

and cam means adjacent the bag holder means for cooperable cam engagement with said cam follower means.

9. A weighing station means for a bag filling machine including track means for moving bag holding means along a path at locations other than said weighing station means, comprising:

weighing means including a yieldably mounted member having upstanding members on opposite sides of said path having a height greater than the height of a bag to be filled at said weighing station means;

track segment guide means generally in alignment with said track means for movement of said bag holding means between said weighing station means and said track means, said guide means being mounted on said upstanding members for supporting therebetween the bag holding means carrying the bag to be filled;

and means biasing said yieldably mounted member to limit deflection thereof while a bag is being filled while supported by said track segment guide means.

10. A weighing station means as stated in claim 9 includes vibrating means carried by said yieldably mounted member for vibrating said weighing means and said bag while being filled.

11. In a receptacle feeding machine including an independently actuatable main article feed means with an associated first weighing station means, and independently actuatable dribble article feed means with an associated second weighing station means, and means for simultaneous movement of receptacles from said weighing stations only after each receptacle is filled to a predetermined weight, the improvement comprising:

receptacle conveying means for transporting receptacles to and from the weighing stations;

a plurality of spaced receptacle holder means operatively engaging said receptacle conveying means for transportation thereby;

means for supporting said receptacle holder means at locations other than said weighing station means;

second receptacle holder support means carried by each of said weighing station means independent of said first receptacle holder means for transmitting loads carried by said receptacle holder means to said weighing station means; and said receptacle holder means including means for suspending and holding the receptacle in open condition.

12. The improvement of claim 11 wherein said means for suspending and holding a receptacle in open condition includes a portion of said receptacle holder means and clamping shoes pivotally mounted thereon and cooperable with said receptacle holder means portion for frictionally retaining the upper open end of a receptacle.

13. The improvement of claim 11 wherein said means for supporting said receptacle holder means at locations other than said weighting station means comprises:

track means fixedly supported adjacent said conveying means;

carriage means mounted on said receptacle holder means and moveably supported on said track means; and means for vertically loosely connecting and suspending said receptacle holder means supported by and below said receptacle conveying means, whereby said receptacle holder means may be supported by said track means at locations other than said weighing station means through said carriage means, or alternatively by said spaced vertically loosely suspending receptacle holder means mounted on said receptacle conveying means.

14. The improvement of claim 11 wherein said weighing station means additionally comprise guard means fixedly mounted independent of said weighing means below said receptacle holder means when positioned on said second receptacle holder means so that vagrant articles fed but not received by the receptacles will not fall upon said weighing means so as to be included in the weight of the receptacle.

15. The improvement of claim 11 additionally comprising tare weight equalizing means supported by each of said receptacle holder means so that the tare weight of each of said receptacle holder means is the same when positioned on said weighing station means by said receptacle conveying means.

16. The improvement of claim 11 additionally comprising means for releasing receptacles from said receptacle holder means after passing said second weighing station means.

17. The improvement of claim 16 wherein said means for releasing the receptacle from the receptacle holder means includes an elongate member operatively connected with said clamping shoes for selective movement thereof, cam follower means mounted on the free end of said elongate member, and cam means adjacent the receptacle conveying means for cooperable cam engagement with said cam follower means.

References Cited

UNITED STATES PATENTS

| | | | |
|---|---|---|---|
| 1,359,586 | 11/1920 | Flagg | 177—160 |
| 1,751,760 | 3/1930 | Rhees | 177—160 |
| 2,246,422 | 6/1941 | Thomason | 177—160 |
| 3,073,399 | 1/1963 | Durand | 177—53 |

FOREIGN PATENTS

| | | |
|---|---|---|
| 1,251,336 | 12/1960 | France. |
| 1,031,207 | 5/1958 | Germany. |

RICHARD B. WILKINSON, *Primary Examiner.*

G. H. MILLER, JR., *Assistant Examiner.*

U.S. Cl. X.R.

177—160; 198—39